Patented May 10, 1932

1,857,346

UNITED STATES PATENT OFFICE

CHRISTOPH BECK, OF LUDWIGSHAFEN-ON-THE-RHINE, AND HELMUT WEISSBACH, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE RECOVERY OF NITRIC ACID

No Drawing. Application filed December 19, 1928, Serial No. 327,177, and in Germany December 31, 1927.

The present invention relates to the process for the recovery of nitric acid.

Nitric acid cannot directly be recovered in a pure state, by distillation or other physical methods of separation, from solutions still containing other volatile acids, especially halogen hydrides. This is not only due to the volatility of the different acids, but above all also due to the circumstances that, for example when halogen hydrides are present, volatile nitrosyl compounds of the halogens, are formed, partly already in the solutions containing nitric acid, partly during the distillation or condensation, which nitrosyl compounds may, under certain circumstances, be recondensed only with difficulty and give rise to considerable losses of nitrogen.

We have now found that a complete separation of the components is effected in an advantageous manner, with the recovery of pure nitric acid or pure salts thereof from solutions containing other volatile acids or their salts in addition to nitric acid, by converting the nitric acid present in the solution by treating the solution with a gaseous reducing agent into nitrogen oxides, and oxidizing these to nitric acid, if desired, after washing with water or alkaline substances. The process can be carried out, for example, by first treating the solution, which may contain still other substances, such as salts or non-volatile acids, in addition to nitric acid and one or more other volatile acids, with reducing agents, such as sulphur dioxide, hydrogen sulphide and the like or gaseous mixtures containing the same, thereby reducing the nitric acid to lower nitrogen oxides. In this case, it is advisable to select such conditions of reaction which effect, preferably, the formation of nitric oxide, because this, on account of its low solubility, can be very easily expelled from the solution. In some cases, however, it is also advantageous to conduct the reduction in such a way that nitrogen trioxide or tetroxide is mainly produced, whereby, when oxidizing same to nitric acid, less oxygen is then consumed. Moreover, the reaction may be facilitated by passing non-reducing gases which may also contain oxygen, for example air or steam, through the reaction mixture, or by evaporating the solution and allowing it to act, in the vaporous state on the reducing agent. In many cases it is advisable to free the resulting nitrogen oxides, especially in the reduction to nitric oxide, from extraneous volatile acids carried along, prior to the oxidation. For this purpose washing with water will often be sufficient; but, if the nitric acid is to be obtained entirely free from extraneous acids, the nitric oxide may be treated with alkaline agents instead of or in addition to the washing with water. In order to oxidize the nitrogen oxides, these are mixed with the required quantity of oxygen or air, and are worked up to nitric acid, or nitrites, or nitrates, in the known manner, for example by absorption with acid or alkaline agents.

The aforedescribed process can be advantageously combined with the production of alkali metal nitrate.

It is already known that alkali metal nitrate can be produced by converting potassium chloride, for example, with nitric acid, the resulting hydrochloric acid being removed by distillation, as for example in vacuo or by a current of inert gas. According to this method of working, however, losses of nitrogen are unavoidable, since nitrogen compounds are carried away from the solution at the same time as the hydrochloric acid. Moreover, the said process also has the disadvantage that the amount of alkali contained in the alkali metal chloride employed is only partially recovered in the form of nitrate.

These disadvantages are obviated and excellent yields of alkali metal nitrate are obtained in a simple manner by combining the aforedescribed process for the recovery of nitric acid or nitrates or nitrites with the production of alkali metal nitrates by converting an alkali metal chloride or sulphate or a mixture of both with nitric acid and, after the conversion and separation of the nitrate, deposited, if desired, by cooling, treating the residual mother liquor with a gaseous reducing agent, the nitrogen oxides expelled from the solution being then converted into nitric acid which is again converted with alkali metal chloride or sulphate to form alkali metal nitrate. The said process may be carried out, for example, in the following manner:

The conversion of the alkali metal salt with nitric acid is effected at the ordinary or at elevated temperature. The resulting deposit of nitrate obtained, if desired, by cooling the reaction solution, is separated from the liquid by filtration, or other like means. By treating the filtrate with a gaseous reducing agent, the nitric acid remaining in the mother liquor is converted into nitrogen-oxygen compounds in a lower stage of oxidation, chiefly nitric oxide, which, after admixture with oxygen or air, are reconverted into nitric acid by any known and suitable manner, as, for example, by absorption in acid solution or by liquefaction. The recovered nitric acid is used again, and employed for converting further quantities of alkali metal chloride or sulphate. It is advantageous to treat the mother liquor, which has been freed from the nitrogen oxides, for the recovery of the alkali contained therein, by precipitating it in the form of the alkali metal salt, of the acid formed by the reduction treatment, such as sulphate or bisulphate. This can be effected by simply cooling the mother liquor, and in some cases the procedure may consist, for example, in distilling off the whole or a portion of the hydrochloric acid resulting from the conversion of the alkali metal chloride, and then precipitating the alkali from the residual solution, if desired, by cooling, in the form of chlorides or as the salt of the acid formed by the reduction treatment. Losses of nitrogen are prevented by this mode of working. The recovered alkali metal compound may be again subjected, together with fresh alkali metal salt, to conversion by nitric acid, either direct or, for example, when the alkali is recovered as bisulphate, after conversion with water or alkali metal chloride, whereby the bisulphate is wholly or partially converted into neutral sulphate. By working in this manner, practically the whole of the alkali and nitric acid employed is converted into alkali metal nitrate.

In the conversion of alkali metal sulphate with nitric acid, a comparatively weak solution of alkali metal nitrate and sulphuric acid is obtained and its separation by distillation would be attended with considerable expense owing to the large quantity of water to be evaporated. Consequently, removing the nitric acid, by reduction with a suitable reducing agent, such as sulphur dioxide, according to the process herein described, results, in addition to the separation of the acids without evaporating, in extensively concentrating the sulphuric acid, so that the whole or the greater portion of the alkali present in the solution separates out in the form of bisulphate, without further trouble, on cooling. Moreover, the process herein described possesses over the usual separation of the nitric acid by distillation the advantage of preventing the nitric acid from becoming enriched with hydrochloric acid which is usually present in the form of its salts in commercial alkali metal sulphate. In the separation of the mixture of nitrate and sulphuric acid according to the present process, the hydrochloric acid remains in the sulphuric acid solution, which is not returned to the process, and moreover can be easily freed from the hydrochloric acid by distillation.

The following examples will further illustrate the nature of the said invention which, however, is not limited thereto.

*Example 1*

1000 kilograms of a solution, containing 150 kilograms of hydrochloric acid and 100 kilograms of nitric acid are heated to 60° and treated, in a stirring vessel, with 55 cubic meters in all of 98 per cent of sulphur dioxide. The escaping nitrogen oxide gases are passed through a reflux condenser mounted on the stirring vessel, then through a tower through which water trickles and which is charged with fillers, and finally through a washing apparatus charged with milk of lime. The nitrogen oxide gases thus purified are then mixed with about 150 cubic meters, in all, of air and conducted to an apparatus for an acid absorption. About 95 kilograms of nitric acid are obtained as an acid completely free from chlorine. In the initial solution remains nearly the whole of the hydrochloric acid as well as the sulphuric acid, formed from the added sulphur dioxide, which can be concentrated by evaporation and at the same time freed from the hydrochloric acid.

*Example 2*

125 kilograms of potassium bisulphate and 600 kilograms of ground potassium chloride containing 57 per cent of $K_2O$ are stirred into 1800 kilograms of nitric acid (24.5° Baumé) at 35° centigrade. When the conversion is completed, the mixture is cooled to $-5°$ centigrade, and the deposited potassium nitrate, is separated from the residual mother liquor by filtration by suction or centrifuging. About 750 kilograms of nitrate, containing 95 per cent of potassium nitrate are obtained which can be still further purified by purging with a saturated solution of potassium nitrate. The mother liquor is treated at about 50° centigrade with the gases obtained by roasting pyrites, the treatment being carried on in a stirring vessel or scrubbing tower until denitration is complete. The effluent nitrogen oxides are washed with water and, after being mixed with the requisite amount of air for the formation of nitric acid, are passed through an absorption apparatus. This treatment results in the recovery of about 25 kilograms of nitrogen in the form of nitric acid, which can be converted into potassium nitrate by renewed treatment with potassium chloride. The whole of the hydrochloric acid, about 300 kilograms, is recovered, in the form of 20 per cent acid, from the denitrated mother liquor by evaporating in a column apparatus. The evaporation residue, on being cooled to ordinary temperature, deposits about 125 kilograms of potassium bisulphate, which is subjected to renewed conversion with nitric acid.

What we claim is:—

1. The process for the recovery of nitric acid which comprises treating a solution containing nitric acid and another volatile acid with a gas comprising sulphur dioxide and oxidizing the nitric oxides liberated.

2. The process for the recovery of nitric acid which comprises treating a solution containing nitric acid, another acid and salts of these acids with a gas comprising sulphur dioxide and oxidizing the nitric oxides liberated.

3. The process for the recovery of nitric acid which comprises treating a solution containing nitric acid, an alkali metal salt and free acid derived from this salt with a gas comprising sulphur dioxide and oxidizing the nitric oxides liberated.

4. The process for the recovery of nitric acid which comprises treating a solution containing nitric acid, an alkali metal halide, an alkali metal sulphate, free halogen hydride and sulphuric acid with a gas comprising sulphur dioxide and oxidizing the nitric oxides liberated.

5. The process for the recovery of nitric acid which comprises treating a solution containing nitric acid and potassium chloride with a gas comprising sulphur dioxide and oxidizing the nitric oxides liberated.

In testimony whereof we have hereunto set our hands.

CHRISTOPH BECK.
HELMUT WEISSBACH.